July 20, 1965 L. H. WADSWORTH 3,196,095
METHOD OF REMOVING SOLIDS IN SOLUTION FROM A LIQUID
Filed Oct. 3, 1960 2 Sheets-Sheet 1

Inventor
LESLIE H. WADSWORTH
By Borst & Borst
Attorneys

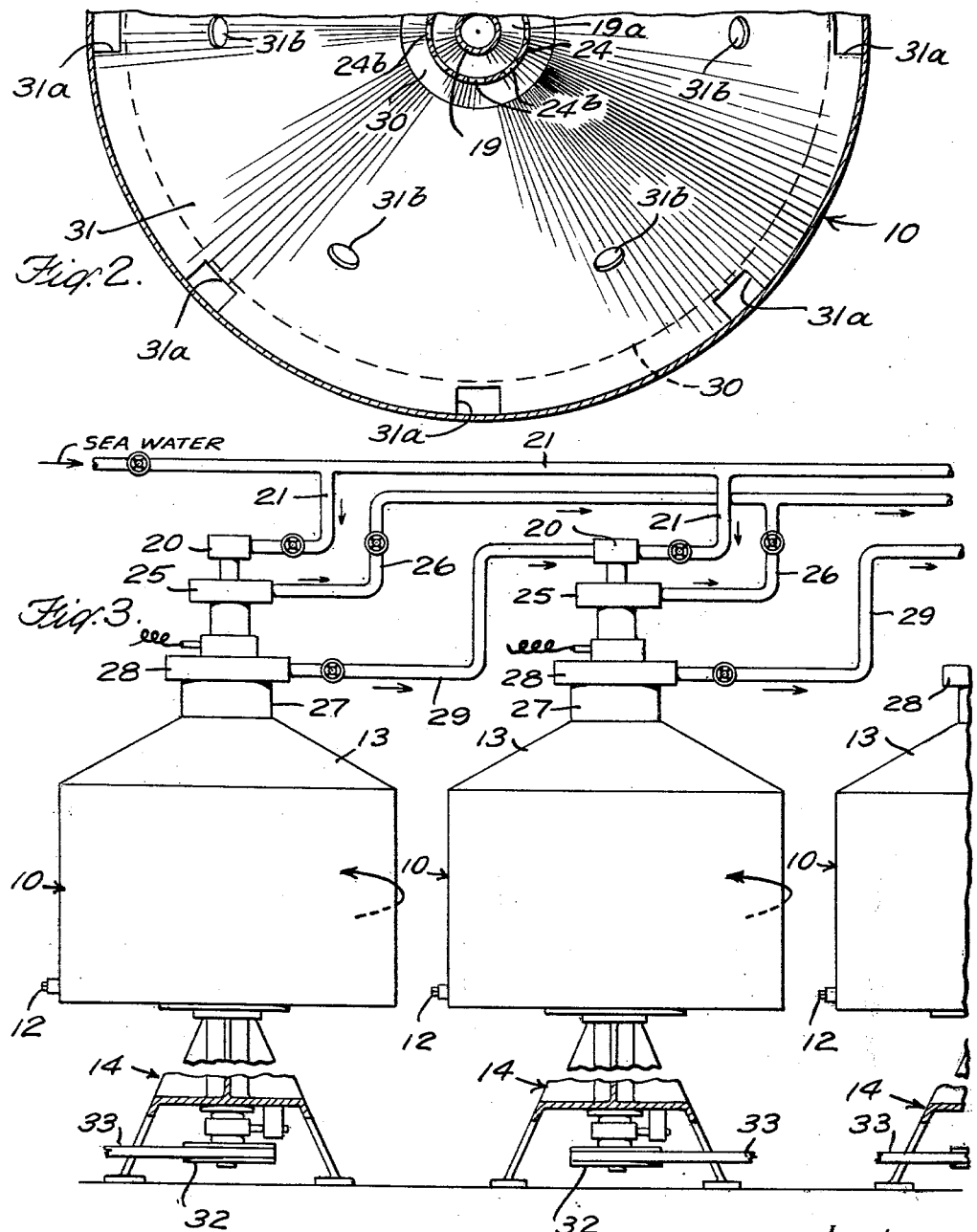

United States Patent Office 3,196,095
Patented July 20, 1965

3,196,095
METHOD OF REMOVING SOLIDS IN
SOLUTION FROM A LIQUID
Leslie H. Wadsworth, 640 West End Ave.,
New York 24, N.Y.
Filed Oct. 3, 1960, Ser. No. 60,146
1 Claim. (Cl. 204—149)

This invention relates generally to the art of purifying liquids by removal of solids in solution therein, and has particular application to converting sea water and other brackish and saline waters to fresh or potable waters. The invention will, therefore, be specifically described in connection with the treatment of sea water.

Much effort has been directed to the desalination of sea water and many plants for the purpose are in operation. In general, they employ vapor compression or distillation processes which require the use of heat and are too costly to operate to be practical for general use. Various other systems have been and are being tried and to some extent operated, including both electro dialysis and centrifuging, but to applicant's knowledge no means or process are known which in terms of cost and result bring the process within the scope of practical operation.

It is the object of this invention to provide a process and apparatus for the purpose which will be practical both from the standpoint of cost and operation. This entails a system which is inexpensive to establish and dependable in its operation and in which the volume of output is such per unit of cost as to make it feasible for general use.

In a broad sense the invention contemplates causing the solids which are in solution in the liquid to concentrate in a portion of the liquid, leaving the rest of the liquid relatively free of the solids, and separating the concentrated portions from the relatively free portions by subjecting the liquid in that state to the action of centrifugal force.

In a sense the liquid may be considered as stratified with the solids largely concentrated and collected in one or more strata and the remaining stratum or strata relatively free of the solids. Since the centrifugal force acting on the liquid is a function of the mass or weight, the centrifuging will cause the heavier or denser layers containing the solids to separate from the lighter layers. The separated liquid bodies are then conducted to separate outlets.

More specifically the segregation of the solid contents into specific layers is effected by the principle of electrolysis. The sea water, for example, is caused to flow in relatively thin sheets between electrodes of opposite polarity on which a sufficient potential is impressed to produce a flow of current through the intervening sheet of water. This current causes the ions to migrate, according to their charge, either to the positive or negative electrode. In this way the strata of the water in each sheet adjacent the electrodes become largely possessed of the ions while the intermediate layer of water is relatively free of ions.

It is evident that if the electrodes are static the ionized particles will accumulate on the electrode surfaces and impair their conductivity until there would be an insufficient current flow to cause the ions to migrate. It is, therefore, essential for a successful continuous operation that there be a continuous flow of water between the electrodes and that the ions be constantly removed from the surfaces of the electrodes. As stated, the invention contemplates for this purpose subjecting the electrodes and the water flowing between them to the action of centrifugal force.

Specifically, according to the invention, the water is caused to pass through a rapidly rotating container and to flow between radially disposed electrodes in the container from the container wall inwardly toward its center of rotation. Preferably, the electrodes are in the form of a series of pairs of proximate conical sheet members or plates with passages providing escape for the water at their outer peripheries and at their centers. Since the centrifugal force is also a function of the velocity, the speed of rotation is so adjusted and the angle which the conical electrodes make with the horizontal is so selected that the developed centrifugal force will overcome the gravity or other force tending to cause the heavier layers of the water sheets to flow inward or toward the center of the container and will reverse this flow and cause the ion containing layers to seek the outer or peripheral portion of the container where this highly saline water is collected and carried off. The lighter or relatively fresh layer of the water is not overcome in its tendency to flow to the center and it is there collected and removed.

This operation may, of course, be repeated if necessary, as by cascading the containers, until the desired desalinity is attained.

Other features of the invention will appear from the following description of the construction and operation of the apparatus embodiment illustrated in the accompanying drawings.

FIG. 2 is a plan of a portion of the apparatus on the plane of line 2—2 of FIG. 1.

FIG. 3 is an elevation on reduced scale of a plurality of apparatuses of FIG. 1 connected in tandem together with a diagrammatic showing of the intercommunicating conduit system.

Figure 1:
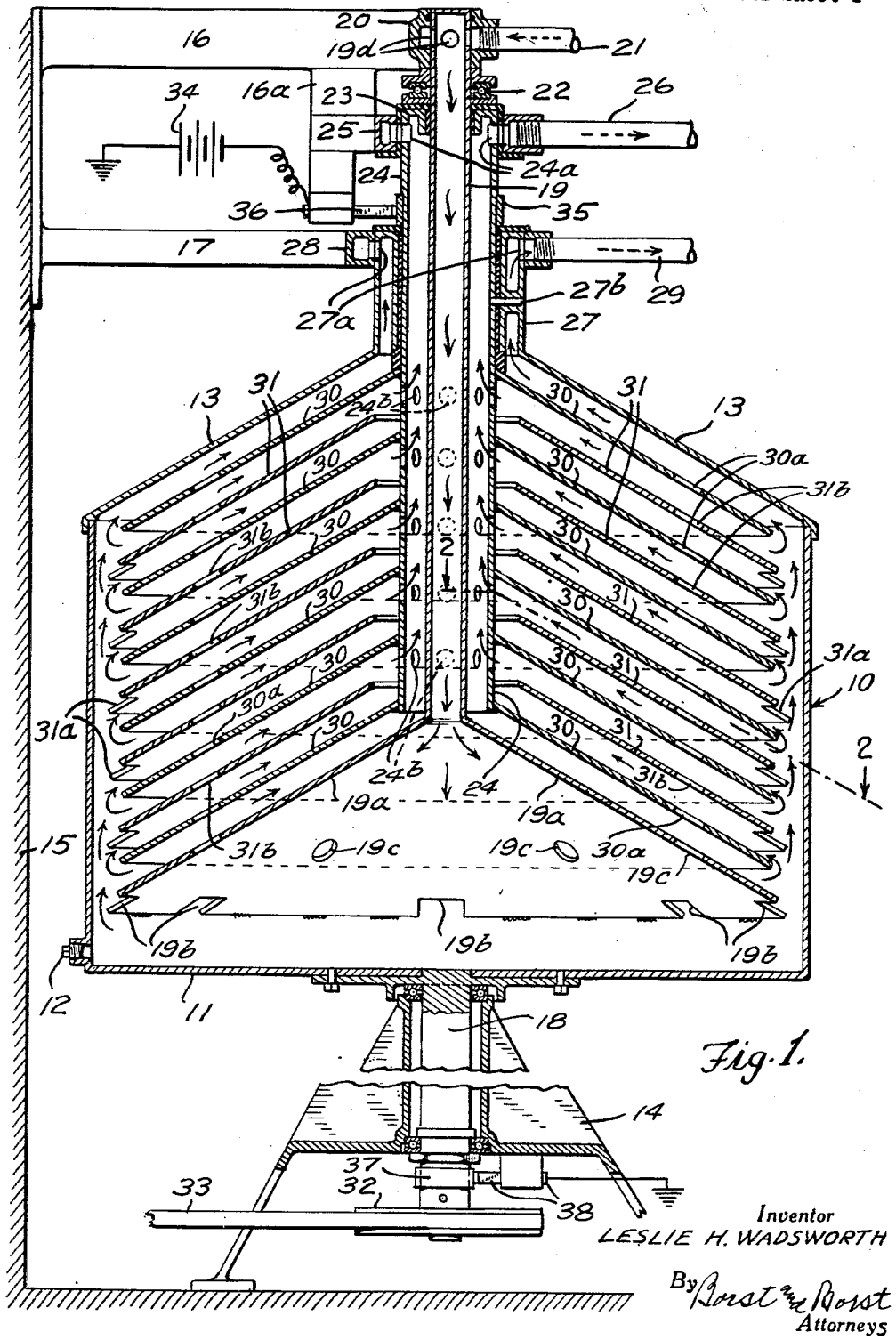
FIG. 1 is a sectional representation, partially diagrammatic, of an apparatus designed for carrying out the method of the invention.

The description will be specific to the desalination of sea water which has a normal saline consistency of approximately 3½%. Of these salts in solution, the sodium, magnesium, calcium and potassium ions have positive charges and the negative charges are primarily on the chloride, sulphate, carbonate, bicarbonate, bromide, fluoride and iodide ions. When subjected to an electrolytic action, these ions will be caused to migrate to electrodes of a polarity opposite that of the respective charges.

The apparatus of FIG. 1 comprises a certrifuge bowl which is basically of conventional construction but which is modified to perform the electrolytic action and otherwise to perform the method of the invention. The bowl 10 is a cylindrical container of suitable sheet metal having a flat bottom 11 and entirely closed at its bottom except for a drain orifice 12. The top 13 of the bowl which is removable for cleaning and other purposes, is conical and is open only at its center. At the opening at the center of the top, there are provided concentric inlet and outlet conduits as will be described. The bowl is mounted in top and bottom bearings for rotation on its central axis.

The bowl is supported at the apex of a pyramidal or conical base structure 14 which rests upon a suitable support from which rises a frame member 15 with two inwardly extending supporting arms 16 and 17. From the bottom 11 an axial trunnion 18 extends downwardly into the base 14 and bears in two antifriction bearings in the base.

An inlet pipe 19 is entered axially into the central opening in the top 13 and extends well toward the bottom of the bowl and outwardly some distance above the bowl. At its bottom end in the bowl, it is provided with a conical flare 19a which is welded or otherwise peripherally secured to the inner wall of the bowl near its bottom and has several peripheral openings 19b as well as intermediate openings 19c so that water entering pipe 19 may freely rise in the bowl.

Near its upper end the pipe 19 has a circumferential series of inlet openings 19d which communicate with a stationary header 20 which is supported on the inner end of the arm 16 and surrounds the pipe 19 and communicates with a feed pipe 21. The pipe 19 at its upper end immediately below the header 20 bears rotatively in an antifriction bearing 22, the upper race of which is non-rotatively attached to the header 20 and the lower race of which rotates with the pipe 19 being supported on a flange 23 carried by pipe 19 and serving as a closure for the upper end of a pipe 24, being shown as integral therewith. The pipe 24 concentrically surrounds the pipe 19 in annular spaced relation thereto and also extends into the bowl, as will be described. Surrounding the upper end of pipe 24 is a stationary header 25 which is supported on a downward extension 16a of the arm 16. This header communicates with a circumferential series of holes 24a in the pipe 24 and also with an outlet pipe 26.

The conical cover 13 has at its apex a cylindrical upwardly extending pipe 27 which has its upper end closed and concentrically surrounds pipe 24, being substantially shorter than the upwardly protruding end of pipe 24 and being annularly spaced therefrom. Surrounding the upper end of pipe 27 is a stationary header 28 which is supported on the inner end of arm 17 and communicates with a circumferential series of soles 27a in pipe 27 and with an outlet pipe 29. The pipe 27 is rotatively fastened to pipe 24, as by through pins 27b in the manner shown.

As shown, the pipe 24 extends into the bowl about the pipe 19 substantially to the inner end of pipe 19 and at spaced intervals the portion of pipe 24 within the bowl has fastened thereto, as by welding, a series of conical metal plates 30 which are parallel with the flaring extension 19a of pipe 19 and also with the cover 13. These conical plates 30 have their outer peripheries spaced from the cylindrical wall of the bowl.

Intermedaite the plates 30 are conical plates 31 parallel with plates 30 and secured, as by welding, to the cylindrical wall of the bowl. The inner peripheral edges of the plates 31 are spaced from the pipe 24 and they have a series of openings 31a at their outer edges to provide passages along the wall of the bowl. Also the plates 30 and 31 may have holes 30a and 31b, respectively, intermediate their edges to allow some communication between the successive spaces between the plates.

As will be seen, each pair of plates 30 and 31 constitute a pair of electrodes between which a sheet of water is caused to flow and access for such water into pipe 24 is provided by a circumferential series of holes 24b in the pipe 24 at the zone between each pair of plates 30 and 31.

Rotation is imparted to the bowl and to the parts attached thereto by any suitable means, as by a pulley 32 on the lower end of trunnion 18 and belt 33. It will be seen that the belt and pulley drive will rotate the bowl 10 and hence the pipe 19 due to the attachment of its flaring inner end to the interior of the bowl, and this pipe 19 acts as the other trunnion support as it rotates in bearing 22. With the bowl, of course, rotates the series of conical plates 31 which are attached thereto.

Through the connection of flange 23, pipe 19 causes pipe 24 to rotate and with it the series of conical plates 30 carried by it. Pipe 27 will rotate due to the pins 27b and to its connection to the cover 13.

In order to constitute the plates 30 and 31 successive pairs of electrodes, means are provided to electrically insulate them from each other and to connect them respectively to opposite poles of a source of electric potential. A battery 34 is shown as a source of D.C. current with one side grounded on the bowl and the other side connected to the pipe 24. A collector ring 35 on pipe 24 is contacted by brush 36 which is carried by arm extension 16a, and this brush is connected to one side of the battery 34. Likewise collector rings 37 on trunnion 18 is contacted by brush 38 carried by base 14 and connected through ground to the other side of the battery. Thus plates 30 and 31 have opposite potential impressed upon them.

These positive and negative elements are insulated from each other. As shown, pipe 19 and pipe 27 which are grounded along with plates 31 are insulated from pipe 24 which carries plates 30 and has connection with the other pole of the battery 34. As shown the plates 30 are connected to the positive terminal of the battery 34. Thus flange 23 through which pipes 19 and 24 are rotatively connected is in two parts which are insulated from each other. Likewise pipe 24 is insulated from header 25. Insulation is provided between pipes 24 and 27, the pins 27b being of insulating material, and insulation being provided between the pipe 24 and the inner wall of pipe 27 which is shown as double walled with the inner wall closely surrounding pipe 24.

Thus the plates 30 and 31 of each pair are constituted opposing electrodes and an electric current will flow though a liquid conductor in which they are immersed. The sea water in the processing serves as such conductor.

In the operation, sea water is admitted under controlled pressure through pipe 19 and is conducted to the bottom of the bowl and tends to flow in sheets upward from between flare 19a and the bottom plate 30, through the space between bottom plate 30 and bottom plate 31, through the space between bottom plate 31 and the second plate 30 and so on, filling the bowl. The water intervening between electrodes 30 and 31 conductively connects the electrodes and the resultant current flow causes the ions to migrate, as above explained. The bowl is at the same time rotated at a velocity to develop a centrifugal force just enough to reverse the flow of the heavy component layers of the water while allowing the intermediate lighter component layer to continue its flow toward the center. Normally with a bowl of around two feet in diameter this would require an angular speed of around 7000 r.p.m. The energy causing the inward flow of the lighter layer results from the pressure head plus force exerted thereon by the reverse force of the heavier component.

Thus the heavier components will be caused to seek the outer periphery of the conical plates and rise through the openings 31a and pass upward through pipe 27 and be led away through pipe 29. The lighter component of each sheet of water will continue to the center and enter openings 24b and rise through pipe 24 and be led away through pipe 26. In each operation approximately 30% of the treated water will enter pipe 26 and 70% will enter pipe 29.

The manner in which the apparatus may be connected in tandem to cascade the purifying treatment will be apparent from FIG. 3. The apparatus may be connected in parallel as shown in FIG. 3 or could be connected in series. As shown the sea water enters each bowl 10 from separate inlet pipes 21. After the water is processed in the bowls the lighter effluent is caused to flow through the outlet pipes 26 while the heavier component of the effluent flows through the pipes 29 to the succeeding bowl where this component is reprocessed together with the incoming sea water from the inlet pipe 21.

While a D.C. source of current is shown it will be understood that a pulsating current may be used to advantage, particularly since such current would afford periodic change in the attraction of the ions to their respective electrodes and thus facilitate their removal from the electrodes by the contrifugal force.

It may be explained that the action of the ions selectively to seek collector plates may be effected by other than electrolysis and it is intended that the use of that term herein shall be broadly construed to include any operation which will cause the ions to migrate and collect in specific zones. Also it will be understood that changes may be made in the specific apparatus shown and de-

I claim:

The method of separating a liquid and solids in solution in the liquid consisting in the steps of causing the solution to flow into at least one peripheral passage defined by the exterior wall of a container and spaced apart and alternately anode and cathode plates within the container, introducing the solution from said peripheral passages into the space between said plates, causing an electric current to pass between the plates and simultaneously centrifuging the solution in said space by spinning said container and plates together, withdrawing the resulting heavier fraction liquid containing solids in solution to the outside of the container by confining the heavier fraction to flow in a direction that directly opposes the head pressure resulting from the incoming flow of said solution thereby causing said heavier fraction to return to the same peripheral passages from which it had flown into said space and from which it is then discharged to the outside, said heavier fraction displacing a lighter fraction liquid in said space toward the spin axis of the container, said lighter fraction liquid being discharged to the outside in a separate passage disposed proximate said spin axis.

References Cited by the Examiner

UNITED STATES PATENTS

| | | | |
|---|---|---|---|
| 780,191 | 1/05 | Johnson | 204—113 |
| 1,093,384 | 4/14 | Charlton | 204—213 |
| 1,862,663 | 6/32 | Curtis | 204—149 |
| 2,016,446 | 10/35 | Merkenschlager | 204—213 |
| 2,085,711 | 6/37 | Biesmann | 204—212 |
| 2,741,591 | 4/56 | Dewey et al. | 204—180 |
| 2,854,394 | 9/58 | Kollsman | 204—180 |
| 3,005,763 | 10/61 | Kollsman | 204—151 |

FOREIGN PATENTS 453,275   3/25   Germany.

WINSTON A. DOUGLAS, *Primary Examiner.*

JOHN R. SPECK, MURRAY TILLMAN, *Examiners.*